June 17, 1969 H. M. DEMAREST, JR 3,450,082
LOAD-BEARING MEMBER FOR CURVED CERAMIC SEGMENTS
SUBJECTED TO HIGH COMPRESSIVE LOADS
Filed Jan. 29, 1968

INVENTOR
HENRY M. DEMAREST JR.

ATTORNEYS

United States Patent Office 3,450,082
Patented June 17, 1969

3,450,082
**LOAD-BEARING MEMBER FOR CURVED CE-
RAMIC SEGMENTS SUBJECTED TO HIGH
COMPRESSIVE LOADS**
Henry M. Demarest, Jr., Natrona Heights, Pa., assignor
to PPG Industries, Inc., a corporation of Pennsylvania
Filed Jan. 29, 1968, Ser. No. 701,484
Int. Cl. B63c *11/00;* B65d *7/02*
U.S. Cl. 114—16                                10 Claims

ABSTRACT OF THE DISCLOSURE

Load-bearing member for curved ceramic segments subjected to high compressive loads under conditions of cyclic loading such as those encountered by deep submergence vehicles. In the case of deep submergence spheres formed from glass hemispheres joined at their peripheral edges, an annular, metal, load-bearing member having certain physical properties is disposed in abutting relationship with the peripheral edges of the hemispheres. It is preferred that the abutting surfaces of the load-bearing member and the edge surfaces of the glass hemispheres be flat, but one or more of the abutting surfaces may be of slightly convex elevation in the absence of a load.

BACKGROUND OF THE INVENTION

The present invention relates to the use of a curved ceramic segment as a pressure-resisting component in a structure and, more particularly, to a member for bearing the load distributed along an edge of such a segment when high compressive forces are applied to a convexly curved surface of the segment. More specifically, this invention relates to a load-bearing member for a curved ceramic segment employed as a hydrostatic pressure-resisting structural component in a deep submergence vehicle.

Oceanography, including deep sea exploration, has aroused considerable interest in recent years. The investigation and development of new materials and structural designs for deep submergence vehicles has been of prime concern in the planning of various oceanographic studies.

In the past, submergence vehicles such as submarines and bathyspheres have been fabricated with relatively high-strength metal hulls to withstand the hydrostatic pressures encountered at various ocean depths. In general, the thickness of the hull is increased with the depth at which the vehicle is intended to operate. Deep submergence vehicles, i.e., vehicles intended to operate at ocean depths greater than about 1,500 feet, have been provided with relatively thick metal hulls.

Increasing the thickness of the hull produces an undesirable increase in the density of the vehicle. Density is as important in deep submergence vehicles as it is in aircraft and spacecraft since it limits the performance capability of such vehicles. High density vehicles containing instruments and, perhaps, human observers, require additional power to maneuver in the ocean depth. If the density is so great that the vehicle exhibits a negative buoyancy, additional motor power or other means are needed to ascend from the operating depth to the surface of the ocean. It is thought that the solution to this density problem rests in the development and utilization of new and different materials for deep submergence vehicles.

Because of their high compressive strength to weight ratios and corrosion resistance, ceramic materials have received much consideration as potential substitute materials for the hulls or walls of deep submergence vehicles. The terms ceramic and ceramic materials are used in a general sense herein and are intended to include glasses, strengthened glasses, and the so-called glass-ceramic materials, as well as fired, high strength ceramic materials such as alumina.

Glass, for example, although it exhibits a relatively low strength when subjected to tensile loading, is capable of withstanding comparatively high compressive loads. The strength of glass can be further enhanced by thermal or chemical strengthening processes well known in the glass manufacturing art. A chemical strengthening process involving an ion exchange treatment such as that disclosed in U.S. Patent No. 3,357,876 to Dale Rinehart, issued Dec. 12, 1967, may be employed to produce glass articles capable of withstanding high compressive loads. Moreover, glass does not fatigue when subjected to compressive loading for extended periods of time.

Glass-ceramic and fired alumina ceramic materials capable of withstanding high compressive loads may also be provided, but chemically strengthened glass articles are preferred for many applications because they usually exhibit a greater degree of transparency.

Since the hydrostatic load encountered by deep submergence vehicles is compressive in nature, curved ceramic structural components which uniformly distribute the load applied thereto should be capable of withstanding deep hydrostatic pressures. Moreover, because the specific gravity of these ceramic materials is less than the specific gravity of conventional metal materials, the use of curved ceramic structural components will also reduce the density of the vehicle to which they may be attached or which they may form in its entirety.

It is important to note that the design configuration of the ceramic segment and related components be such that excessive tensile stress is not developed when the segment is subjected to compressive loading. It is generally accepted that articles formed from these ceramic materials will not break unless a tensile stress of a magnitude greater than the compressive stress present near the surface of the article is induced. For this reason, curved ceramic shapes such as hollow spheres and cylinders, or segments thereof are preferred for use as structural components in deep submergence vehicles. Manufacturing limitations are such that curved segments approximating spherical and cylindrical segments are normally provided. The hydrostatic load applied to the convexly-curved surface of such a component is uniformly distributed through the wall or shell of the component. A hollow sphere is believed to be the best hydrostatic load-resisting design configuration available.

Hydrostatic loading tests conducted on hollow spheres formed by joining two glass hemispheres together at their peripheral edges have demonstrated that the glass hemispheres are capable of withstanding high compressive loads. However, these tests also indicated that an improved method of joining the hemispheres together is required if full advantage is to be taken of the high compressive strength-to-weight ratio of glass and the other ceramic materials previously described.

It can be shown mathematically that a load approximating 100,000 pounds per square inch is induced at the interface where the hemispheres are joined together when a 10 inch outside diameter sphere having a nominal wall thickness of ½ inch is subjected to a pressure of 10,000 pounds per square inch which approximates the hydrostatic load the sphere would be subjected to at an ocean depth of about 21,000 feet. A load approximating 170,000 pounds per square inch would be induced at the interface where the hemispheres are joined together if the same sphere were subjected to an external pressure of 17,000 pounds per square inch which is believed to approximate the hydrostatic load which could be encountered in the deepest parts of the ocean.

The load induced at the interface where the hemispheres are joined together is inversely proportional to the area of the interfacing surfaces. Thus, even greater interfacial stresses would be induced in hollow spheres having the same outside diameter but thinner walls. Spheres having relatively thin walls are preferred because of the additional reduction in vehicle density.

Moreover, the problem of accommodating the interfacial load developed under compressive loading appears to be even more acute for larger glass spheres. Spheres having outside diameters of 5 to 7 feet are presently contemplated for use in deep submergence studies.

These high interfacial loads may induce tensile stress of a magnitude sufficient to cause breakage or spalling at the interfacial joint unless a proper stress distributing system is employed. Such a system must be capable of withstanding interfacial loads on the order of 100,000 to 200,000 pounds per square inch under cyclic conditions of loading.

Cyclic loading conditions are believed necessary to prove reliability. During use, these spheres are subjected to loading as they descend to the desired depth and the load is reduced later as they ascend to the surface. A glass sphere capable of withstanding the load applied as it descends, but not capable of returning to the surface without suffering damage as the load is removed, is of limited utility.

The hollow spheres, previously referred to, each consisted of a pair of annealed, semi-tempered or chemically strengthened glass hemispheres joined together at their peripheral edges. In certain instances, the peripheral edges of the hemispheres were placed in direct abutting contact, whereas other spheres were formed with a thin gasket material disposed between the peripheral edges of the hemispheres. In still other instances, the peripheral edges of annealed glass hemispheres were fusion welded together. In general, the spheres formed by fusion welding the peripheral edges of the glass hemispheres, and the spheres formed by placing the peripheral edges of the hemispheres in direct abutting contact, withstood greater hydrostatic loading than the spheres formed with a gasket material interposed between the peripheral edges of the hemispheres.

The spheres formed by fusion welding the peripheral edges of the hemispheres were permanently sealed. Once sealed, such spheres cannot be opened for the insertion or removal of instruments without breaking the seal. A demountable joining system is preferred to provide access to the interior of the spheres.

SUMMARY OF THE INVENTION

This invention provides an improved load-bearing system for joining curved ceramic segments together, or for distributing the load applied to a curved ceramic segment attached to a deep submergence vehicle which will render the segment capable of withstanding loads in excess of 100,000 pounds per square inch induced at the edge of such a segment under conditions of cyclic loading. This invention rests in the recognition of the complex physical phenomenon occurring at the peripheral edge of the ceramic segment as the load is applied and removed, and the application of this knowledge to provide an improved load-bearing member. The selection of corresponding mating surfaces for the edge of the segment and the stress-bearing member which cooperate in such a manner as to further preclude the inducement of tensile stress at the edge of the ceramic segment constitutes another part of this invention.

This invention comprises placing the load-bearing peripheral edge or edges of the ceramic segment in direct abutting contact with a load-bearing member comprising a high-strength material having a ratio of Poisson's ratio to Young's modulus not greater than that of the ceramic segment material and a coefficient of friction with respect to the ceramic material sufficiently high that it will prevent interfacial slippage between the segment and the load-bearing member as the load is applied and later as the load is removed. In the case of spherical ceramic segments, whether they be hemispheres or smaller segments, it is preferred that the load-bearing member be of annular form disposed continuously around and abutting the peripheral edge surfaces of adjacent segments. A curved ceramic segment provided with an edge surface substantially normal to the major surfaces of the curved segment is preferred to distribute uniformly the load applied to the segment across the width of the edge placed in direct contact with a surface of the load-bearing member.

The need for these particular relationships between the physical properties of the ceramic material of which the segment is comprised and the material of which the load-bearing member is comprised will be described in greater detail in conjunction with the following discussion of the preferred embodiments of this invention.

It will also be shown that an additional advantage can be obtained by designing one or more of the surfaces in abutting contact to have a slightly convex configuration to insure the absence of any abutting surface of concave configuration at each joint of the spherical body.

Moreover, although the invention has been described in terms of providing an improved load-bearing system for joining curved ceramic segments, it is also important to note as will readily be apparent from the following description, that the present invention provides a system for joining such components that permits one or more components to be readily removed to provide access to the interior of the deep submergence vehicle.

These and other advantages offered by the present invention will become apparent upon further study of the following description of a preferred embodiment of the invention taken in connection with the accompanying drawings.

BRIEF DESCRIPTION OF THE DRAWINGS

In the drawings, wherein like numerals represent like parts.

DESCRIPTION OF THE PREFERRED EMBODIMENT

Figure 3:
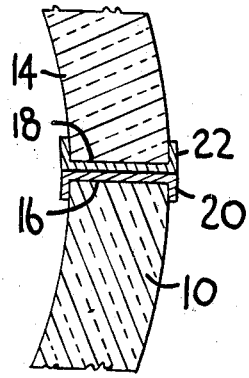
FIG. 3 is an enlarged, fragmentary sectional view of the load-bearing system provided around the great equator of the sphere illustrated in FIGS. 1 and 2.
Figure 2:
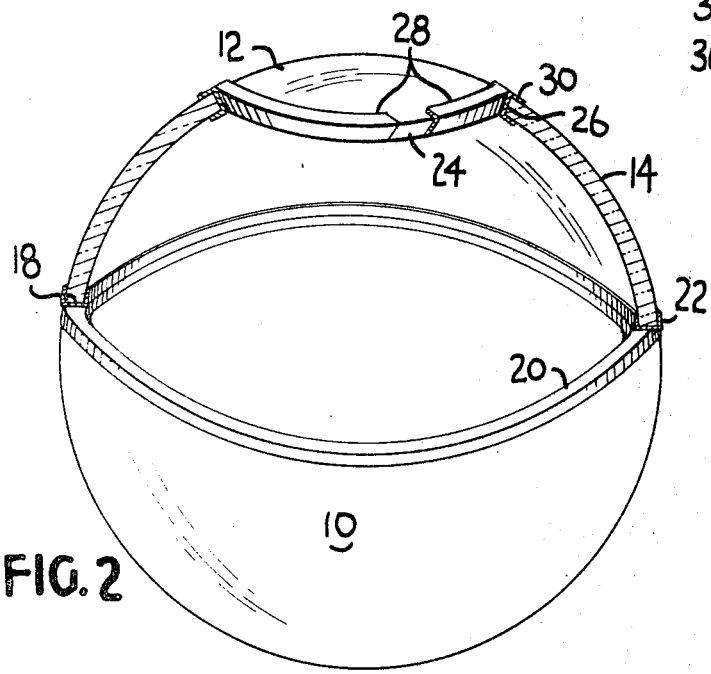
FIG. 2 is a similar view of the hollow glass sphere of FIG. 1 with portions of the sphere cut away to show details of construction.

Referring now to the drawings, a preferred embodiment of the present invention will be described. In FIGS. 2 and 3 the load-bearing system of the present invention is illustrated in the manner in which it would be employed to join chemically strengthened, sperical glass segments having a nominal wall thickness of .360 inch together to provide a hollow glass submergence sphere.

In FIG. 2 a glass hemisphere 10, a glass polar segment 12, and an intermediate spherical segment 14 are joined together at their peripheral edges to form a hollow submergence sphere. The glass hemisphere 10 has a peripherial edge 16 (FIG. 3) and the intermediate glass segment 14 has a peripheral edge 18 conforming in contour to that of peripheral edge 16.

A load-bearing member of this embodiment consists of a pair of channel-shaped, load-bearing members 20 and 22 positioned in snugly-fitting relation over the peripheral edges 16 and 18, respectively. The outer surfaces of the webs of the channel-shaped members 20 and 22 are in surface-to-surface contact with each other.

The polar segment 12 has a peripheral edge 24 and the intermediate glass segment 14 has another peripheral edge 26 that conforms in contour to that of peripheral edge 24. Additional load-bearing members consisting of additional pairs of abutting members such as channel-shaped members 28 and 30 are in direct surface-to-surface contact with each other in a manner similar to the contact between the channel-shaped members 20 and 22 as required between adjacent spherical segments to complete the hollow sphere structure.

Figure 4:
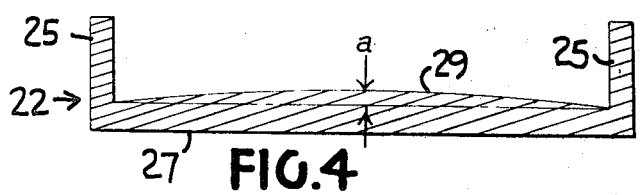
FIG. 4 is a greatly-enlarged sectional view of a preferred embodiment of the load-bearing member of the present invention with certain elements exaggerated for purposes of illustration.

The channel-shaped members 20, 22, 28, and 30 are annular members formed from a high strength stainless steel alloy. An enlarged sectional view of a typical channel-shaped member 22 is illustrated in FIG. 4.

For a ten-inch outside diameter sphere formed from glass segments having a nominal wall thickness of .360 inch, the channel-shaped member 22 is formed with a web width providing sufficient clearance for a snug fit, and legs 25, .010 inch thick by about ⅛-inch long. The outer surface 27 of the web is planar and is machined to close tolerances to conform in contour to the outer surface of the web of abutting channel-shaped member 20. The inner surface 29 of the web may also be planar to conform in contour with the peripheral edge 18 (FIG. 3) of spherical glass segment 14. However, to insure that the maximum load points are not at the lateral boundaries of the edge surface 18, a web surface 27 or 29 of member 22 and/or edge surface 18 may be slightly convex but not concave. Thus, web surface 29, illustrated in exaggerated form in FIG. 4, is a convexly-curved surface having an elevation $a$ above the plane represented by the broken line which the surface 29 would occupy if it were parallel to surface 27. A slight elevation of .001 to .002 inch is believed to be satisfactory.

Figure 1:
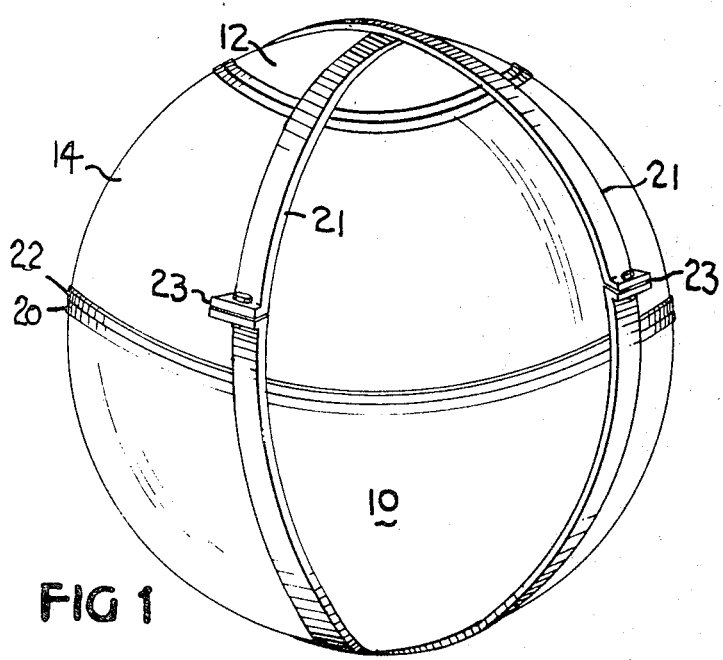
FIG. 1 is a perspective view of a hollow glass sphere formed from a plurality of spherical glass segments joined together in accordance with the teaching of the present invention.

No materials are positioned between the peripheral edges of the glass segments and their respective channel-shaped members nor between the interfacing surfaces of the channel-shaped members. When assembled, these components of the hollow glass submergence sphere are placed in direct glass-to-metal or metal-to-metal contact. In order that the segments may be retained in the desired relationship during handling prior to submergence, auxiliary means such as elastic bands or metal straps 21 (FIG. 1) with means for tightening the same, such as turnbuckles 23, may be disposed in circumferential relation around the sphere. In the alternative, once assembled, the hollow glass sphere could be encapsulated in a thin plastic film to maintain the segments in the desired relationship in the absence of significant compressive force applied to the convex surfaces of the curved segments. However, these auxiliary means are necessary to hold the components in their desired relationship prior to submergence only. Once the sphere is carried to an appreciable depth beneath the surface of the ocean, the hydrostatic pressure bearing on the convex surfaces of the curved glass segments forces the components together. Since the edges are merely placed in direct surface-to-surface contact, the segments can be readily disassembled after the sphere returns to the surface.

Figure 5:
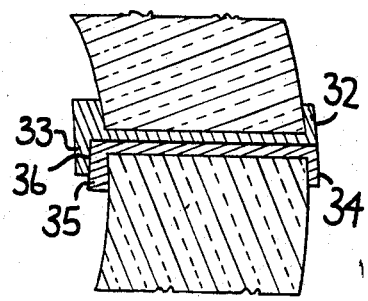
FIG. 5 is an enlarged fragmentary sectional view of an alternate load-bearing and aligning system provided in accordance with the present invention.

FIG. 5 illustrates an enlarged sectional view of an alternate load-bearing and aligning system. FIG. 5 illustrates a load-bearing member consisting of channel-shaped members 32 and 34 similar to members 20 and 22 of FIG. 3. However, in FIG. 5, member 32 is formed with a flange 33 which extends over the inner surface portion 35 of member 34. The interfacing surfaces of flange 33 and member 34 are illustrated at 36. With this arrangement, the spherical segments provided with snugly-fitting members 32 and 34 may be maintained in their desired alignment to form a tight unitary structure.

Figure 6:
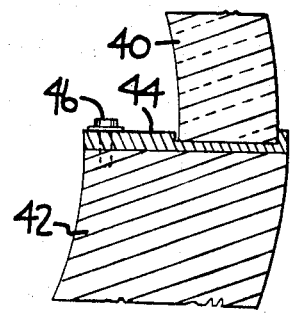
FIG. 6 is a fragmentary sectional view illustrating the manner in which a thin-walled, curved glass segment may be attached to a conventional thick-walled hull of a deep submergence vehicle.

FIG. 6 illustrates the manner in which a thin-walled, curved glass segment 40 may be provided with a load-bearing system and joined to a relatively thick walled complementary curved metal wall component 42. Glass segment 40 may be of spherical or cylindrical curvature depending upon the design required by the particular vehicle to which it is attached. In FIG. 6 a curved glass segment 40 is positioned in a channel provided in a load-bearing member 44 fixed to the relatively-thick metal hull member 42 by a bolt 46 threaded into suitable aligned holes provided in the metal hull 42 and member 44. In FIG. 6, if the material of which the hull member 42 satisfies the criteria of the present invention, a channel could be provided directly therein to receive the peripheral edge of the curved glass segment 40 without the need of an intermediate load-bearing member 44.

As mentioned previously, the load-bearing members are formed of a high-strength material having additional physical properties which cooperate with the contacting edge surface of the adjacent ceramic segments to preclude the inducement of tensile stresses when a load is applied to the convexly-curved surfaces of the curved segments. The load-bearing members must be formed of a high-strength material in order that they will withstand the extremely high stresses applied thereto by the curved ceramic segments.

High strength stainless steel alloys are preferred as the material for the load-bearing members. Type No. 431 stainless steel manufactured and sold by Allegheny Ludlum Steel Corporation of Pittsburgh, Pa., is preferred. This alloy is rated in the manufacturers' Stainless Steel Handbook as having a yield strength of up to 220,000 pounds per square inch, depending upon heat treatment. This alloy should be capable of withstanding the interfacial loads developed at ocean depths greater than 20,000 feet. The 400 series of stainless steel alloys are also preferred for use in conjunction with chemically strengthened glass segments because the coefficients of thermal expansion of these materials are compatible.

Other high strength metal alloys may also meet these criteria and could of course be substituted for the Type No. 431 stainless steel alloy. Other metal alloys having a yield strength less than that of Type No. 431 stainless steel, but sufficient to withstand the interfacial loads developed at ocean depths between 1,500 and 20,000 feet, may be employed in vehicles intended to operate in those regions of the ocean, so long as those alloys meet the additional physical property requirements of this invention.

The other requisite properties of the material from which the load-bearing member is formed is that it must have a ratio of Poisson's ratio to Young's modulus not greater than that of the ceramic segment it contacts, and a sufficiently-high coefficient of friction to prevent interfacial slippage between the edge of the segment and the load-bearing member as the load is applied and removed.

As the load is applied to the major surfaces of the curved ceramic member, it is distributed through the walls of the member and concentrated on the bearing surface of the load-bearing member. The edge of the curved ceramic segment is ground and polished to provide a smooth peripheral edge normal to the major surface of the segment in order that the load will be uniformly distributed over the abutting surface of the load-bearing member. As the load is applied, there is a vertical compression of the glass (in its circumferential direction) and load-bearing member that is inversely proportion to Young's modulus. The vertical compression of a glass segment can be represented as $$\Delta gv \propto \frac{1}{Eg}$$

where $Eg$ is Young's modulus for the glass material. In a similar manner, the vertical compression of the load-bearing member can be represented as $$\Delta bv = \frac{1}{Eb}$$

where $Eb$ is Young's modulus for the load-bearing member.

In accordance with Poisson's ratio, the vertical compression will produce a lateral expansion $\Delta gx$ in the glass segment and $\Delta bx$ in the load-bearing member. Therefore, there will be a lateral expansion, i.e., parallel to the plane of the interface between the components, which can be represented as:

$$\Delta gX \propto \frac{\mu g}{Eg}$$

for the glass segment, and $$\Delta bX \propto \frac{\mu b}{Eb}$$

for the load-bearing member.

Considering the lateral expansion $\Delta x$ represented by the ratios of Poisson's ratio to Young's modulus set forth above and assuming a sufficient coefficient of friction between the curved glass segment and load-bearing member to prevent interfacial slippage, the material having the higher $\Delta x$ ratio will be restrained from expanding laterally by the other material. Therefore, if $\Delta bx$ is greater than $\Delta gx$, the edge of the glass segment restricts the lateral expansion of the load-bearing member with the correlative effect that the lateral expansion of the load-bearing member tends to expand the peripheral edge surface of the glass segment. This lateral expansion of the peripheral edge of the glass segment induces tensile stresses which cause the glass edge to break or spall if they are of sufficient magnitude.

If, on the other hand, $\Delta bx$ is less than $\Delta gx$, then the load-bearing member restricts lateral expansion of the peripheral edge surface of the curved glass segment. This restriction compensates for Poisson ratio induced tensile stresses and, in addition, stresses the peripheral edge of the curved glass segment in compression and thereby reduces the tendency of the glass to spall.

It should be noted that if $\Delta bx$ is equal to $\Delta gx$, then the tensile stresses may be avoided without adding to the strength of the edge. For this reason, the maximum value of the ratio of Poisson's ratio to Young's modulus for the load-bearing member ($bx$) may be equal to that of the ceramic material ($gx$), although it is preferred that the ratio of Poisson's ratio to Young's modulus for the load-bearing member be less than that of the ceramic material.

The coefficient of friction between the edge surface of the curved ceramic segment and the load-bearing member is also important. Even under the above preferred conditions, if the coefficient of friction between the interfacing pressure-bearing surfaces is not sufficiently high, the edge surface of the ceramic segment having the greater tendency to expand laterally may not be effectively restrained by the abutting surface of the load-bearing member. A coefficient of friction sufficient to overcome the difference $\Delta gx - \Delta bx$, is required. As will be pointed out below, a sufficiently-high coefficient of friction between the interfacing surfaces is equally as important when the load is being removed as when the load is applied.

Undesirable tensile stresses may also be introduced at the peripheral edge of the ceramic segment if the edge of the segment and the abutting surface of the load-bearing member do not conform with one another as the load is applied. This is particularly true if the lack of conformity is such that maximum load points result near the lateral boundaries of the interface between the abutting surfaces. Therefore, it is preferred that the abutting surface of the load-bearing member be of slight convex elevation relative to the edge surface of the ceramic segment to insure that maximum load points will not be created near the lateral boundaries of the interface as the load is applied. A convex elevation of .001 to .002 inch across a load-bearing surface .500-inch wide is believed to be satisfactory.

The performance of materials having the previously described properties under cyclic loading conditions has been demonstrated in laboratory tests. In these tests, chemically strengthened glass discs about ½ inch in diameter by .100-inch thick were subjected to uniaxial compressive loading in a standard test machine. The discs were axially aligned between truncated conical members which were employed to apply the load to the discs. The truncated conical members were formed from Type No. 431 stainless steel. The interfacing surfaces of the strengthened glass disc and the stainless steel members were polished planar surfaces.

The test was conducted by alternately applying a compressive load to the truncated conical members and removing the load. The load applied was sufficient to develop a load of 200,000 pounds per square inch at the interfaces between the polished surfaces of the stainless steel members and the glass disc. This test was terminated after 20 cycles without failure of the glass disc or damage to the surfaces of the disc.

Additional tests were conducted under similar conditions but employing a disc formed from Type No. 431 stainless steel engaged between a pair of chemically strengthened glass members. The pressure cycle test was succesfully repeated without damage to the surfaces of the glass members bearing against the surfaces of the stainless steel disc.

Similar tests were conducted employing .005-inch thick tetrafluoroethylene resin (Teflon) discs between the surfaces of the chemically strengthened glass discs and the stainless steel members. In several tests using this arrangement of materials, uniaxial compressive loads of between 150,000 and 200,000 pounds per square inch were successfully applied to the discs. However, in each test the glass discs broke before 10 to 20 percent of the load was removed. This breakage was attributed to the lubricating effect of the resin discs. The lack of sufficient frictional force at the surfaces of the glass disc permitted the surfaces to slip relative to the steel surfaces when the load was applied, thus omitting the establishment of a compressive stress in the glass. As the load was removed, a tension stress was generated in the interfacial surface portions of the glass.

The ratio of Poisson's ratio to Young's modulus for the crystallized glass-ceramic materials and most glasses, including the chemically strengthened glasses, is within the range of about $2 \times 10^{-8}$ to $3 \times 10^{-8}$ square inches per pound. Therefore, in addition to having a yield strength sufficient to withstand the load applied thereto, the load-bearing members of this invention should be formed from a material having a ratio of Poisson's ratio to Young's modulus in the aforesaid range, depending on the specific ceramic material involved, and preferably less than about $2 \times 10^{-8}$ square inches per pound. The coefficient of friction between the abutting surfaces of the ceramic segment and the load-bearing member must also be greater than the difference between the lateral expanding forces ($\Delta gx - \Delta bx$) previously described.

The ratio of Poisson's ratio to Young's modulus for Type No. 431 stainless steel is about $1 \times 10^{-8}$. The coefficient of friction between a commercial grade soda-lime-silica glass and Type No. 431 stainless steel is 0.2 or greater, depending on cleanliness of the interfacing surfaces.

The principle of the present invention has been described as fully and concisely as possible in terms of the physical properties of the materials involved, the stresses induced, and the manner in which they are believed to be inter-related in the practice of the present invention. Certain described relationships may not occur exactly as described and other properties or stresses may exist which have neither been observed or described. The term "spherical structure" that appears in the claims is meant to cover spherical sections as well as spheres.

What is claimed is:

1. In a spherical structure provided with a curved segment of ceramic material having a convex, pressure-resisting outer surface and a smooth edge surface for distributing an external load applied to said convex surface to other components of said structure, said edge surface being substantially normal to said outer surface of said segment and a load-bearing member having a surface disposed in abutting relation to one of said other components, said ceramic segment and said load-bearing member tending to develop tension stress in the plane of said abutting edge surfaces when said structure is subjected to said external load, the improvement wherein said load-bearing member consists of a high-strength material having a maximum ratio of Poisson's ratio to Young's modulus equal to that of said ceramic material and said abutting edge surfaces are sufficently clean and free of any lubricant to produce a sufficiently high coefficient of friction between said load-bearing member and said ceramic material to prevent interfacial slippage between said abutting surfaces of said segment and of said load-bearing member when said load is applied or removed, said load-bearing member having sufficient strength under tension and capable of furnishing a frictional force to said ceramic segment edge surface greater than the difference in the lateral expansion forces resulting from application of said external load to impart a compressive load to said edge surface of said ceramic segment in the plane of said interface of sufficient magnitude to help avoid spalling or breakage of said ceramic edge surface when said external load is changed sufficiently to have caused said ceramic segment edge surface to develop a tension stress in the plane of said interfacial surface of sufficient magnitude to cause the glass to break or spall in the absence of said compressive load applied through said frictional force, said load-bearing member being free of any material having a ratio of Poisson's ratio to Young's modulus greater than that of said ceramic material.

2. The structure of claim 1 wherein said curved segment is a spherical glass segment, and said load-bearing member is a metal annular member.

3. The structure of claim 1 further including means for holding said edge surface of said curved ceramic segment in abutting relation with said load-bearing member in the absence of significant compressive force applied to the convex surface of said curved segment.

4. In a hollow submerged sphere comprising a plurality of spherical segments of ceramic material having smooth edge surfaces extending substantially normal to the major surfaces of the segments, and a load-bearing member positioned in abutting relation between adjacent edge surfaces of said spherical segments, said segments and said member tending to develop tension stress along said abutting edge surfaces when said sphere is subjected to an external load, the improvement wherein said load-bearing member consists of a high-strength material having a maximum ratio of Poisson's ratio to Young's modulus equal to that of said ceramic material, and said abutting edge surfaces are sufficiently clean and free of any lubricant to provide a sufficiently high coefficient of friction between said load-bearing member and said ceramic material to prevent interfacial slippage between said abutting surfaces of said segment and of said load-bearing member when said load is applied or removed, said load-bearing member having sufficient strength under tension and capable of furnishing a frictional force to said ceramic segment edge surface greater than the difference in the lateral expansion forces resulting from application of said external load to impart a compressive load to said edge surface of said ceramic segment in the plane of said interface of sufficient magnitude to help avoid spalling or breakage of said ceramic edge surface when said external load is changed sufficiently to have caused said ceramic segment edge surface to develop a tension stress in the plane of said interfacial surface of sufficient magnitude to cause the glass to break or spall in the absence of said compressive load applied through said frictional force, said load-bearing member being free of any material having a ratio of Poisson's ratio to Young's modulus greater than that of said ceramic material.

5. The submergence sphere of claim 4 wherein said load-bearing member is comprised of a high-strength metal alloy having a ratio of Poisson's ratio to Young's modulus less than about $2 \times 10^{-8}$ square inches per pound and a minimum coefficient of friction with respect to said ceramic material of about 0.2.

6. The submergence sphere of claim 4 wherein said sphere comprises a pair of hemispheres and said load-bearing member comprises a metal annular member positioned between the peripheral edges of said hemispheres.

7. The submergence sphere of claim 6 wherein at least one of said hemispheres comprises a chemically strengthened glass hemisphere.

8. The submergence sphere of claim 4 wherein at least one of the surfaces of said load-bearing member abutting an edge of a spherical segment is slightly convex relative to said edge.

9. The submergence sphere of claim 4 further including means for holding said plurality of spherical ceramic segments in abutting relation with said load-bearing member in the absence of significant compressive force applied to the convex surfaces of said curved segments.

10. The submergence sphere of claim 4, wherein said spherical segments are composed of chemically strengthened glass.

References Cited

UNITED STATES PATENTS

| | | |
|---|---|---|
| 700,769 | 5/1902 | Hazard. |
| 3,329,297 | 4/1967 | Jordan _____ 114—16 X |
| 3,351,035 | 11/1967 | McLean _____ 114—16 |

TRYGVE M. BLIX, Primary Examiner.

220—5

U.S. Cl. X.R.